March 7, 1933. E. B. KRAMER 1,900,880
PROCESS AND APPARATUS FOR MANUFACTURE OF SCREW CAPS
Original Filed July 22, 1931 6 Sheets-Sheet 1

Inventor
Eric B. Kramer.
By Cushman, Bryant Darby
Attorneys

March 7, 1933.  E. B. KRAMER  1,900,880
PROCESS AND APPARATUS FOR MANUFACTURE OF SCREW CAPS
Original Filed July 22, 1931  6 Sheets-Sheet 2
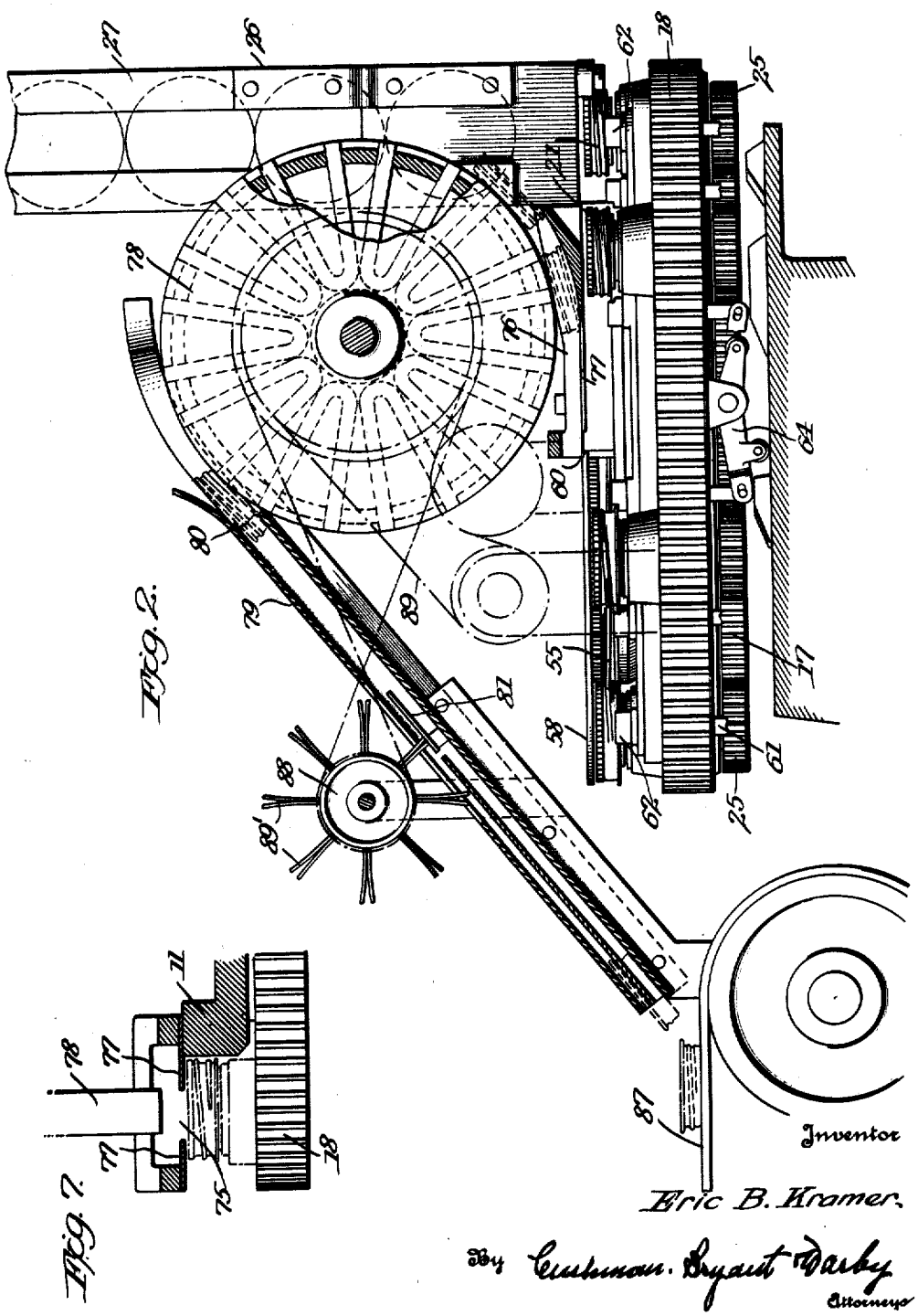

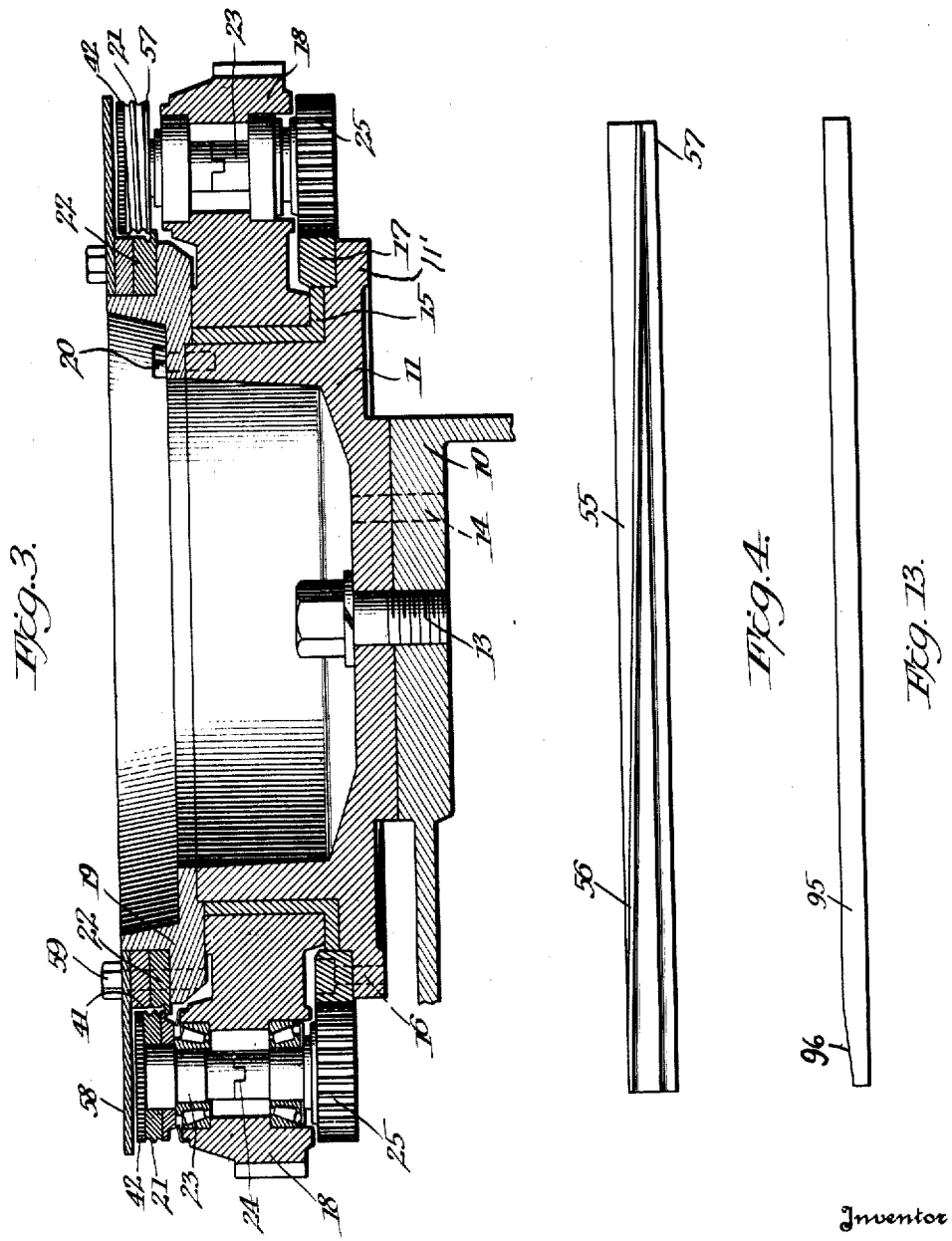

March 7, 1933. E. B. KRAMER 1,900,880
PROCESS AND APPARATUS FOR MANUFACTURE OF SCREW CAPS
Original Filed July 22, 1931 6 Sheets-Sheet 4
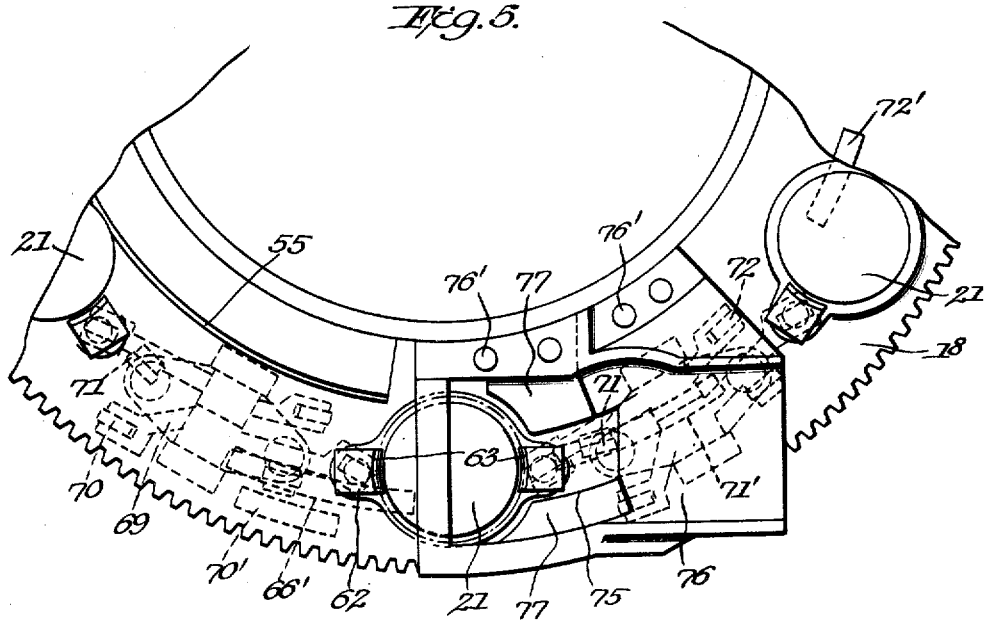
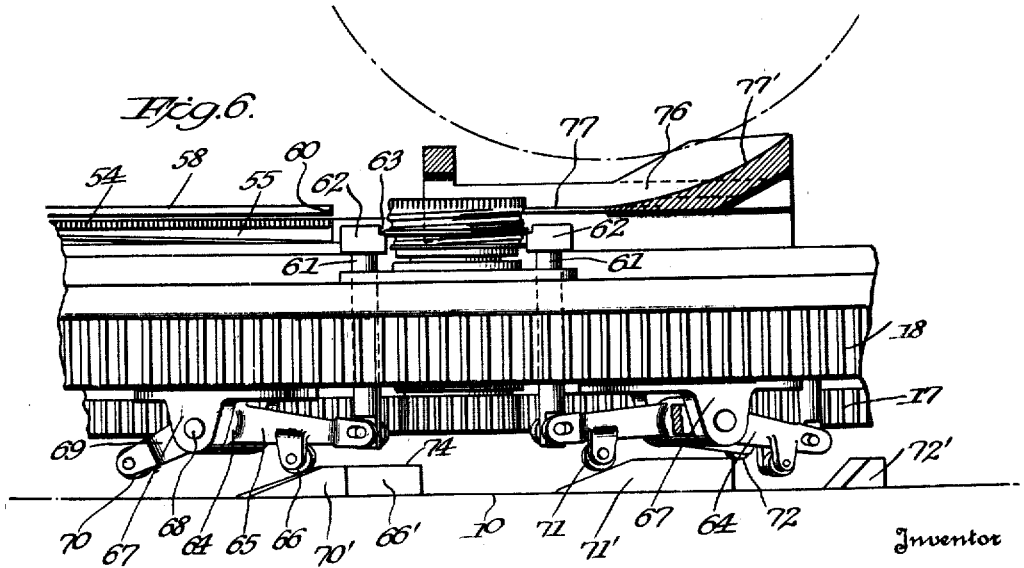
Inventor
Eric B. Kramer.
By Cushman, Bryant & Darby
Attorney

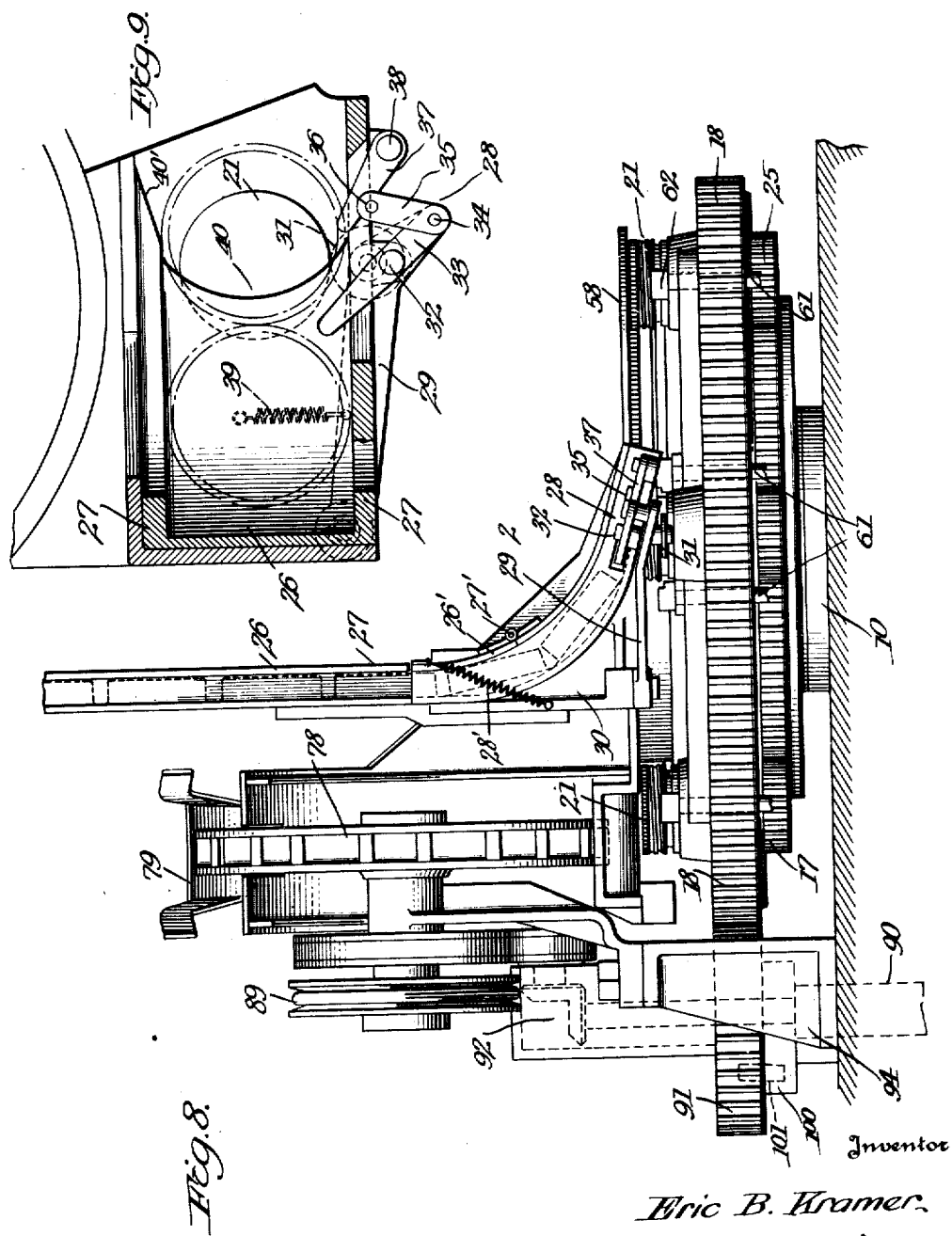

March 7, 1933.  E. B. KRAMER  1,900,880
PROCESS AND APPARATUS FOR MANUFACTURE OF SCREW CAPS
Original Filed July 22, 1931   6 Sheets-Sheet 6
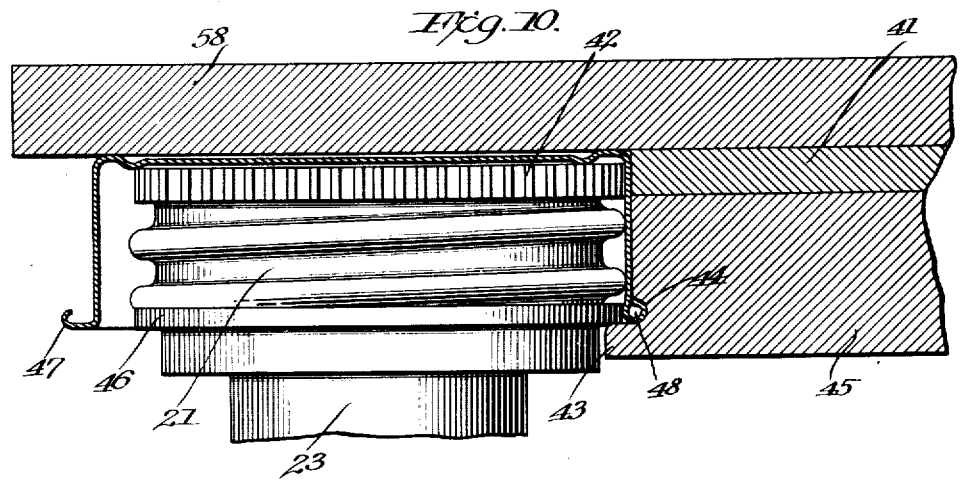
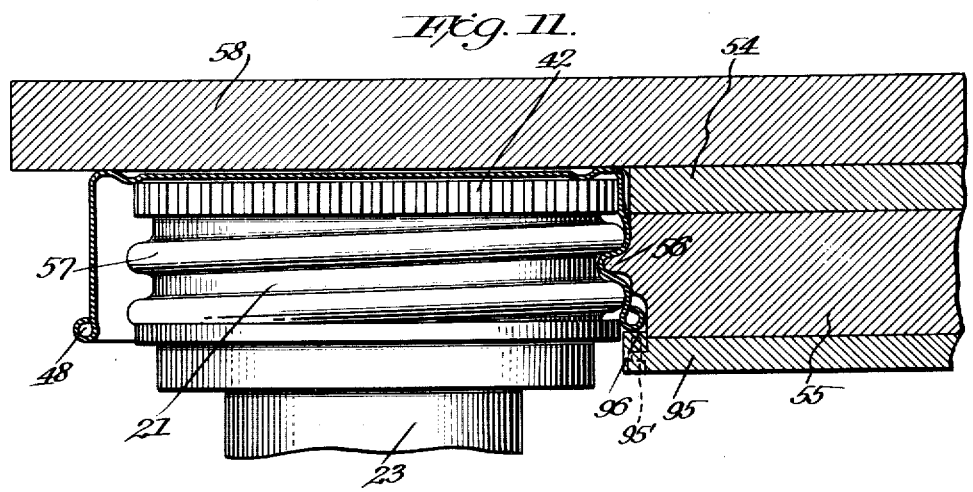
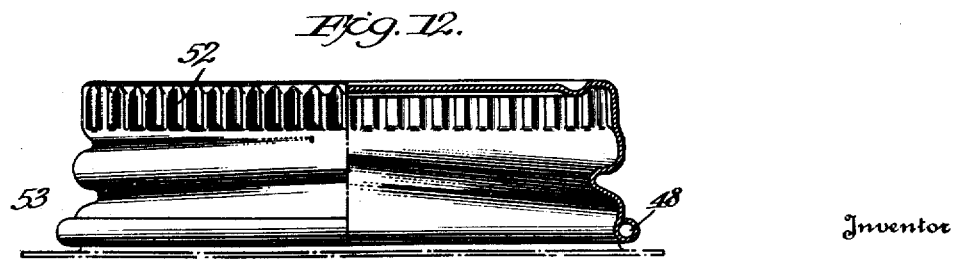
Inventor
Eric B. Kramer.
By Cushman, Dryant Darby
Attorneys Patented Mar. 7, 1933

1,900,880

UNITED STATES PATENT OFFICE

ERIC B. KRAMER, OF BALTIMORE, MARYLAND, ASSIGNOR TO CROWN CORK & SEAL COMPANY, INC., OF BALTIMORE, MARYLAND, A CORPORATION OF NEW YORK

PROCESS AND APPARATUS FOR MANUFACTURE OF SCREW CAPS

Application filed July 22, 1931, Serial No. 552,493. Renewed December 22, 1932.

The present invention relates to a method and apparatus for forming screw caps to produce a product having novel features constituting a marked departure from the conventional article.

The primary object of the invention is to produce a screw cap which will have no thin or weakened areas such as would induce cracking of the material or marring of the finish while producing screw caps. An important object of the invention is to provide a process and apparatus for producing the novel screw cap of my allowed copending application, Serial No. 552,494, filed July 22, 1931.

A further object of the invention is to produce an article of this class in which the thread is formed in the cap, by what is, in effect, a folding of the metal as distinguished from present methods and machines which distend the metal and stretch and weaken the material.

A further object of the invention is to produce a cap having a thread provided with a shelf which sharply approaches a plane substantially horizontal or perpendicular to the axis of the cap, that is a thread which will hook under the ledge of the conventional glass thread in such manner as to obtain a very high sealing force and a minimum of outward wedging pressure.

With this in mind, it is an added object of the invention to produce a cap having a deep thread which, in effect, is provided with a shelf having a substantially horizontal portion hook, and wherein this is accomplished by feeding an oversize blank to the machine of this invention and shrinking the blank while folding the metal of the thread without distending the blank material, so that the thickness of the metal of the skirt and thread are of uniform thickness and free of any weakened areas.

A very important object of the invention is to produce the completed cap having a thread and a curled or wired edge, and also preferably a knurl, by a single operation, i. e. continuously acting on the cap in successive steps. In the present invention, the blank which is cupped, i. e. provided with a depending skirt and preferably with a flange at the edge of the skirt, is fed into the apparatus and the operations are completed by bodily moving the blank, at the same time giving it a rotational movement in contact with the various working tools. When the completed cap is at the end of its bodily movement, it is removed and inverted automatically to a position where a liner may be inserted; hence the complete cap is produced automatically from the cupped or hat-shaped blank, in its passage through the machine until it reaches a point where it is disposed in inverted position to receive a liner.

A further object of the invention is to provide a method and apparatus for automatically producing a cap wherein the blanks are supplied to the machine automatically and selectively and carried through a series of automatic operations to obtain the finished cap.

A further object of the invention is to automatically produce and feed the cap blanks to the machine where the blank is automatically completed into a cap, so that the step of forming the blank from the raw material, its feed to the machine and formation into a completed article, the interpositioning of the required liner in the completed cap and its placing in a packaging receptacle, will constitute one continuous automatic operation entirely avoiding manual effort.

A further object of the invention is to provide a process and apparatus wherein the blank is successively worked upon to produce first the wired edge and thereafter is simultaneously worked upon to produce both a knurling of the cap and the thread.

It is an important object of this invention that bending and folding of the thread is accomplished by permitting a free shrinkage of the material, eliminating in this manner the objectionable stretching of the prevailing method. The free shrinkage is accomplished by forming the entire thread progressively and in a direction from the top of the cap toward the free edge of the skirt, as distinguished from forming simultaneously several portions of the thread. In this manner the skirt of the blank is bent or folded progressively along the line of helix, while the rest of the skirt is not clamped, but is permitted to shrink or shorten in accordance with the stresses set up in the bending operation.

A further object of the invention is to provide an improved process for removing a completed cap from the machine which will be entirely automatic in its operation and which will act at a proper time to remove each cap and dispose it in position to be automatically transferred to a liner inserting machine.

An additional object of the invention is to provide a process, whereby the completed cap is transferred to a liner inserting machine with its open end disposed in position to receive a liner.

Referring to the drawings,

Figure 2 is a view in side elevation.

Figure 3 is a sectional view showing in detail the carriage mechanism.

Figure 4 is a view of the thread forming die.

Figure 5 is a top view of mechanism for removing the completed cap.

Figure 6 is an elevational view of the removing mechanism.

Figure 7 is a sectional view of means associated with the removing mechanism for supporting the cap.

Figure 8 is a further elevational view of the machine.

Figure 9 is a detail view in section of the means for feeding the cap to the machine.

Figure 10 is a view in section showing the cap during the formation of the wired edge.

Figure 11 is a sectional view of the cap during the formation of the knurl and the thread.

Figure 12 is a view partly in section of the completed cap, showing in broken lines the length of the original shell or cap blank and in full lines the completed article to indicate the shrinkage of the shell, and Figure 13 is a view of the cam device for assisting in shrinking the skirt during the threading operation.

Figure 1:
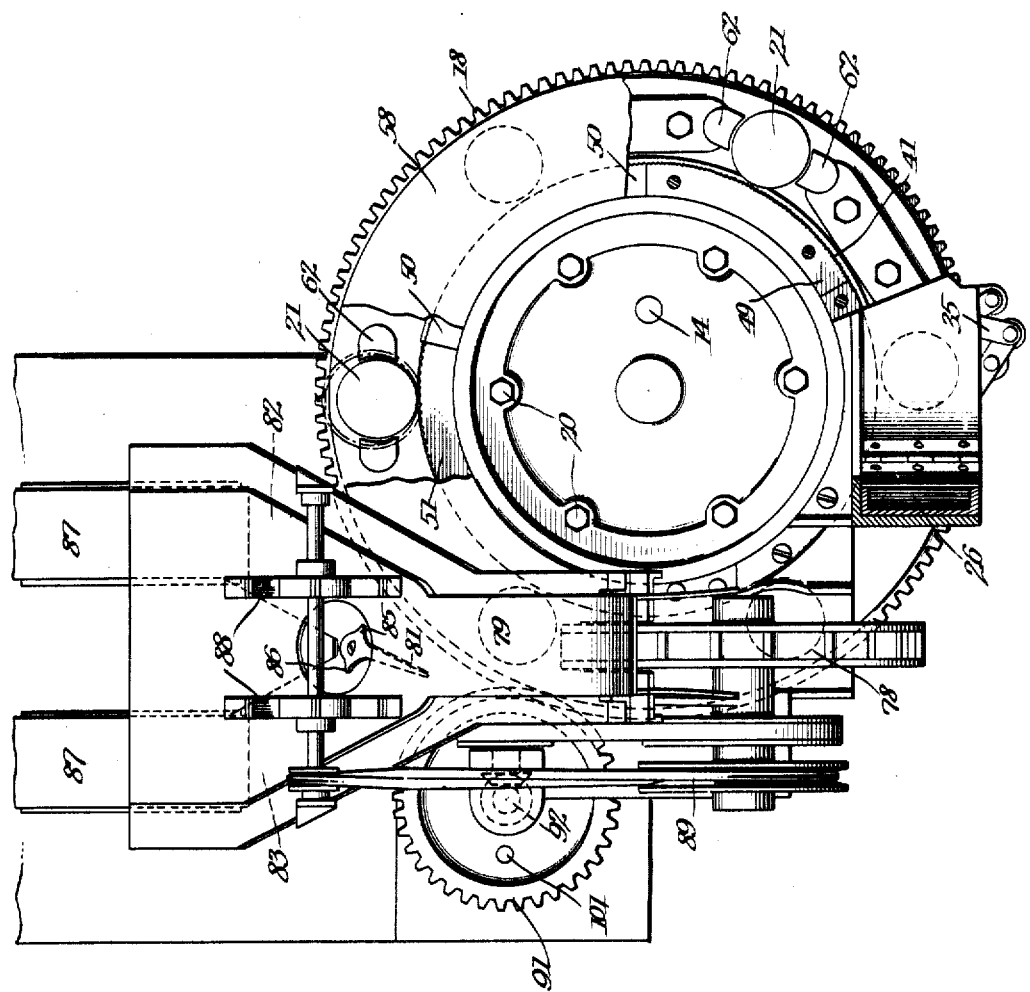
Figure 1 is a top plan view.

Referring to the drawings, the numeral 10 indicates a support upon which the machine is mounted. Secured to the support, as shown in Figure 3, is a supporting frame or base 11 which is rigidly held against turning by means of the bolt 13 and suitable dowels 14.

The supporting frame 11 has pressed on its periphery or remote from its center which is located substantially at the bolt 13, a suitable bushing or liner 15 of substantially L-shaped construction which is preferably circular to form a bearing. The supporting frame also carries fixed thereto by means of bolts 16, a circular gear 17 for a purpose which will be presently described.

Rotatably mounted upon the supporting frame about the bushing 15 is a circular carriage 18 and the housing for the carriage 18 is completed by a ring 19 bolted to the supporting frame at 20. The radially inner surface of the ring-like carriage is mounted directly upon the bushing 15 so that the periphery of the base 11 provides a large bearing remote from its center and substantially close to the bearings for the mandrel shafts on the carriage 18 hereinafter described. The carriage is maintained against lateral movement by a flange 11' on the base at one side of the carriage, and a ring 19 at the other side of the carriage and secured to the base, as by bolts 20. The ring 19 and flange 11' fit closely against the carriage and without interfering with rotation thereof effectively prevent lateral movement. Moreover, they provide a substantially closed or housed bearing for the carriage. The carriage 18, as stated, is adapted for rotation about the peripherally disposed bushing 15 on the fixed support 10 and carries in bearings spaced circumferentially thereof and disposed relatively close to the carriage bearing as compared to the center of the base, the latter being located at the bolt 13, a plurality of spaced mandrels indicated as a whole at 21. These mandrels are adapted for rotation on axes substantially paralleling the upstanding or peripheral bearing surface provided by the bushing 15 (Fig. 3) and are formed to cooperate with fixed dies indicated as a whole at 22 carried by the ring 19. The ring or carriage 18 is therefore mounted on the support 10 and more particularly on a peripheral or upstanding surface of the support 10. This surface provides a bearing disposed substantially parallel to the axes of the mandrels. The flange 11' and the superimposed flange of the L-shaped bushing 15 thereon serve to resist lateral or downward movement of the carriage and complement the main peripheral bearing surface.

Each mandrel 21 is mounted on a stem or shaft 23 which is preferably split as at 24 and adapted to rotate in ball bearing mountings in the carriage 18. It will be observed that the bearings for the mandrel shafts 23 are relatively close to the carriage bearing; in other words, the bearing for the carriage is substantially closer to the mandrel bearings than to the center of the base 11, thereby effectively resisting any tendency toward disalignment of the parts. The relatively large bearing surface afforded by the periphery of the base 11, disposed remote from the center of the base, reduces wear from friction to a minimum, since the total load per square inch upon the bearing is proportionately reduced as the area of the bearing is increased. The rotating carriage 18 is the principal moving part of the machine, and is operated to produce caps at the rate of four hundred (400) per minute, thereby involving between sixty (60) and seventy (70) revolutions per minute of the carriage; hence the importance of disposing the bearing for the carriage in the manner described and illustrated will be readily understood. At it lower end the stem 23 has fixed thereto a gear 25 adapted to continuously mesh with the "Sun" gear 17 on the supporting frame. Thus, it will be seen that as motion is imparted to the gear 18, it will act as a rotating carriage and at the same time the mandrels will likewise be caused to follow a course of rotation. That is to say, the caps are given a bodily movement and a simultaneous rotational movement.

Referring to Figures 2, 8 and 9, the numeral 26 indicates a gravity feed mechanism for the cap blanks which is connected with the blank forming machine, so that as the blanks are stamped, they are automatically deposited for carriage to the cap forming machine. The gravity feed mechanism 26 comprises a chute having confining flanges 27 and communicates with a downwardly curved guideway 28 bolted to the base 19. This guideway 28 is enclosed and may be formed either integral with the chute 26 or as a separate casting connected thereto. The blanks pass by gravity into the downwardly curved enclosed guideway 28, where they are engaged by a selective feeding means, as will now be described.

This feeding means comprises an arm 29 pivoted to an upstanding frame member 30, preferably integral with the guideway 28 and carries a roller or disc 31, which as the carriage gear 18 is rotated engages successively the several mandrels. Pivoted upon the chute by a pivot pin 32 is a lever 33 which is connected to the arm 29 by a pivot pin 34. Pivoted upon the pin 34 is a link 35 connected by a pivot pin 36 with a lever 37, which is pivoted at 38 upon the chute.

A spring 39 normally acts upon the lever 29 to draw the same inward toward the chute and to dispose the disc 31 in the immediate path of the mandrels.

In Figure 9, the mandrel is indicated in engagement with the disc 31 and the disc has been pushed out, permitting a cap in the chute to drop upon the mandrel. When the feeding mechanism has been so pushed out or acted upon by a mandrel, the link 35 which is pivoted upon the arm 29 retracts the lever 37, which normally extends in the path of the chute and permits a cap which is restrained by the lever 37 to pass from the chute to the mandrel. At the same time, the lever 33 which is normally out of the path of caps in the chute is caused by the movement of the arm 29 to revolve on its pivot 32 and project within the path of the caps as shown.

The purpose of this mechanism is to insure that while normally the lever 33 is retracted and the lever 37 is projected into the path of the caps, when the lever 29 is retracted withdrawing the lever 37 from the path of caps in the chute and permitting a cap to be expelled, the lever 33 will be moved into the path of the chute, so that only a single cap will be discharged for each actuation of the disc 31.

As will be clear from Figure 9, this feeding mechanism is disposed adjacent the mouth 40 of the downwardly curved chute or guideway, so that when the lever 37 is retracted and a cap discharged from the mouth, it will tilt downwardly and be immediately caught by the adjacent mandrel and positioned thereon to be carried about through the forming operations. It will be understood that the cap blanks are of sufficiently greater diameter than the diameter of the mandrels to insure a positive catching of each cap which passes over the edge of the mouth 40 and that the construction is so timed that a cap will be released and tilted to be engaged by the mandrel which has engaged the disc 31 and released the lever or stop 37.

The guideway, as stated, is entirely enclosed, but is provided with a gate 26′, which is hinged at 27′ and normally retained closed by the spring 28′. This gate will permit entrance to the guideway should occasion require. It will be noted that the side wall of the guideway adjacent the mouth 40 is cut away at 40′, so that as the mandrel swings in its circular path on the carriage 18, no obstacle will be presented to its movement.

It will, moreover, be noted that the lever 37 is disposed slightly in advance of the mouth 40, which as shown is curved, so that immediately upon release of the lever 37, the cap will by reason of the gravity and the pressure of caps above it, be forced a sufficient distance out of the mouth to tilt and be caught by the mandrel which is passing beneath the mouth as described.

Referring to Figures 1 and 3, the forming members 22 carried by the fixed supporting frame, specifically by the ring 19 connected thereto, are arranged in segments to accomplish the several operations necessary to form a completed cap.

As the hat-shaped blank is initially received by a mandrel, it is subjected to a wiring operation and while this is being conducted, the cap is retained as shown in Figure 10 against all movement, except that afforded by the rotary motion of the large gear 18 and the mandrel upon which the cap is mounted. That is to say, the gear 18 gives the blank a bodily movement or movement of translation and simultaneously the stationary gear 17 rotates the mandrels and the cap blanks are thus given a rotational movement.

In the first segment the cap is securely held by the slightly roughened member 41 cooperating with the knurled portion 42 of the mandrel, while the projection 43 and recess 44 of the member 45 on the fixed frame cooperate with the ring 46 on the mandrel to produce the curl 47.

In other words, in the first segment, the carriage is rotating as are the mandrels and the cap is rigidly held while the curl 47 is produced through the cooperation of the member 45 of the fixed supporting frame and the ring 46 of the rotating mandrel.

In the second segment, the curl is completed and the wire edge formed as shown at 48 by the continued cooperation of the respective members. The first segment is indicated at 49 and the second at 50, in Figure 1.

In segment 51, the cap is simultaneously knurled, Figures 11 and 12, as shown at 52, and provided with a spiral thread 53. For accomplishing this operation the segment 51 of the fixed supporting frame carries a die 54 knurled to cooperate with the knurled portion 42 of the mandrel, and a thread forming die 55 indicated in detail in Figure 4. It will be noted that the thread forming die 55 carries a substantially diagonally arranged projection 56, which extends the entire length of the segment and is slightly greater in length than the length of the spiral thread to be formed in the cap, but is removed from the edge 57 of the segment a distance equal to that of the wire edge 48. In this manner no opportunity is presented for the thread forming dies to act upon the curled edge nor can these dies bind the curled edge and prevent free shinkage of the blank skirt during the thread forming operation. Thus the thread is formed in the skirt above the curled edge.

This die member 55 cooperates with the thread die 57 carried by the mandrel to produce a thread.

At this point it should be observed upon reference to Figure 11, that in the forming of the thread by reason of the cooperation of the die members 55 and 57 that the cap will not be stretched or the metal thereof distended, since the cap is not restrained from shrinking. Therefore, as the rotating carriage and rotating mandrel traverse the die members 54 and 55 of the segment 51, the forming of the thread causes the material of the skirt of the cap to fold and shrink, the cap, as will be clear from Figure 11, being freely supported to permit this result. As illustrated in Fig. 11, there is sufficient clearance above the curled or wired edge to permit the latter to rise and the skirt to decrease in height in the thread-forming operation.

As will be understood, the rotational movement of the cap blanks over the thread-forming section (Fig. 4) as the carriage is revolved, causes the single diagonally disposed thread-forming track 56 to indent or press the skirt of the cap into the thread groove of the mandrel or rotating die on the carriage. Since only a single thread-forming track is provided on the segmental fixed die, the entire thread is produced progressively and continuously by movement along the line of helix for the desired distance, which will depend upon the length of the track 56. This track construction is distinguishable from constructions wherein a plurality of tracks are provided for simultaneously engaging several portions of the cap skirt and simultaneously forming several corresponding portions of the thread. In the operation of this mechanism, the entire thread is formed in a progressive movement beginning in a plane spaced from the edge of the cap skirt and continuing downwardly toward the cap skirt, the skirt being left free to shrink or reduce in height as the thread is formed.

By reason of the formation of the thread by a shrinking or folding action, it is possible to produce a much deeper thread and a thread having a shelf, sharply approaching the horizontal or a plane substantially perpendicular to the axis of the cap as shown in Figure 12. The deeper thread enables an extension to be produced which in the practical application of the cap to a container will engage sufficiently beneath the ledge of a glass thread to insure a very high downward pressure or sealing value and a very low outward wedging pressure. This is true since the shelf of the cap thread will engage the ledge of the glass thread close to the wall of the container and at a point remote from a point on the surface of the glass thread described by a diameter drawn through the center of curvature of the glass thread parallel to the top or bottom of the container. In other words, the improved process makes it possible to produce the novel continuous-thread construction disclosed in my copending allowed application, Serial No. 552,494, filed July 22, 1931.

It will be understood that as the gear 18, constituting the mandrel carriage, is rotated and the respective mandrels are rotated, by means of the gear 25 engaging the "Sun" gear 17, that the speed of rotation will be so controlled that each mandrel will make at least one and preferably more than one complete revolution and present the entire circumference of the shell or blank to each die segment during its traverse past each segment. In the case of the forming of the thread, the operation is controlled to present the shell to the die for more than its circumference and the die segment is correspondingly lengthened, to provide the spiral thread.

Thus in passing the first segment the curled edge 47 will be produced, in passing the second segment the wire 48 will be completed and in passing the third segment the knurling and threading of the cap will be accomplished.

Referring to Figure 3, a suitable ring 58 is employed which is bolted to the ring 19 and the bolts 59 for this purpose also act to confine the respective die members which are mounted in the ring 19.

The ring 58 covers or shields the working parts of the fixed carriage, that is the segments 49, 50 and 51, and also acts to confine and shield the cap blank in its movement past the segments. This ring extends from adjacent the mouth 40 to a point adjacent the removing mechanism.

I have preferably indicated three working segments 49, 50 and 51 and the distance between the feeding mouth 40 and the point 60 accommodates the feeding and removing mechanism.

It will be understood that all of the segments are of substantially the same dimensions and the space between the ends of segments 49, and 51, is sufficient to include a period of time to allow a cap to be fed to a mandrel, as well as to allow a cap to be removed therefrom, no other working operations being accomplished between the points 40 and 60.

The removing mechanism comprises, as best shown in Figures 5 and 6, a plurality of cams disposed on the base 10 between the ends of segments 49 and 51 and which are adapted to be engaged by a mechanism on the rotating carriage or gear 18.

This mechanism comprises, as best shown in Figures 5 and 6, a pair of plungers 61 arranged upon diametrically opposite sides of the mandrel and carrying lifting blocks 62, the latter as shown in Figure 6, having arcuate recesses 63 to engage beneath the wired edge of a completed cap on the mandrel.

At their lower ends the plungers 61 which, as stated, are mounted for reciprocation in the rotating gear 18, are each freely connected to a lever 64. One arm 65 of the lever has an offset portion carrying a roller 66. The lever is pivoted in suitable trunnions 67 to the bottom of the traveling gear 18, as shown at 68, and has another arm 69 which is offset beyond the roller 66 and carries a similar roller 70.

The construction of the operating mechanism for the other plunger 61 is substantially the same, except that the roller 71 is offset, so as to be out of alignment or out of the path of travel of the rollers 66 and 70 and the roller 72 is likewise offset, so as to be out of line of travel of the rollers 66, 70 and 71.

By mounting the levers 64 in trunnions 67, it will be seen that the lever and its associated arms may rock to raise and lower the respective plungers 61 and lifting blocks 62 and the means for rocking the levers will now be described.

Mounted on the base are a plurality of cams, the cam 66' being designated the up cam and the cam 70' the down cam. These cams, it will be noted, are out of alignment but are arranged to receive the respective rollers 66 and 70.

With respect to the opposite lever 64, the up cam is designated at 71' and is out of alignment with the cams 66' and 70' and the down cam 72' is spaced beyond the cam 71' and out of alignment with that cam, as well as cams 66' and 70'. The cams 71' and 72' are in alignment with the path of travel of the rollers 71 and 72 respectively.

Upon examination of Figures 5 and 6, it will be observed that immediately as the mandrel and its its associated mechanisms pass from the segment 51 and ring 58 and reach the lifting point designated by the position of the cams just described, the levers 64 will be rocked upward by reason of the engagement of the rollers 66 and 71 with the inclined sides 73 of the up cams 66' and 71', so that the plungers 61 are simultaneously moved up with the arcuate recesses in the blocks 62 receiving the wire edge of a finished cap carried by the mandrel and raising it from the mandrel and since the inclined surfaces of the cams merge with substantially plane surfaces 74, the cap is held in this raised position throughout the travel of the rollers 66 and 71 thereon. When the cap is raised in this manner, the plungers moving with the carriage or gear 18 pass through a slot 75 of a shelf designated in Fig. 7 as a whole at 76 which is secured upon the fixed carriage 19 by bolts 76'. This shelf is, in effect, a guideway in the form of a casting having inwardly extending spaced plates or flanges 77 integral with or bolted to the casting at the bottom thereof and extending a sufficient distance apart to permit the stripper blocks 62 to pass therebetween longitudinally of the slot 75, but of less spaced distance than the diameter of the cap. The flanges terminate or merge into an upwardly curved throat 77' formed on the casting and adapted to receive the caps.

Again referring to Figure 6, as the rollers 66 and 71 reach the limit of the plane surfaces 74, the cam rollers 70 and 72 engage respectively the down cams 70' and 72', whereupon the levers 64 are rocked in the opposite direction to lower the plungers 61. When the plungers are so lowered, the cap is left resting upon the flanges 77 of the shelf construction 76 and the plungers 61 are moved down sufficiently rapidly to insure that they will not contact with the closed end of the slot or shelf.

Cooperating with the shelf mechanism wherein the flanges 77 are preferably disposed horizontally, but which may be made inclined if desired, is a magnetic pick-up wheel 78. This wheel carries a plurality of electromagnets or ordinary permanent magnets of sufficient force to attract and remove the caps from the flanges 77 of the shelf 76. It will be noted that the magnetic wheel or carrier attracts and holds the caps by the top thereof, so that as it revolves, and passes the cap to a receiving chute 79, the caps are disposed therein with their open ends upward, as shown in Figure 2.

The magnets pass sufficiently close to the shelf to assure of attracting the caps, but if for any reason a cap is not removed as fast as deposited by the stripper blocks 62, the next cap as it moves on the shelf will push it upwardly on the throat 77' and thus closer to the magnets. The throat therefore acts as a guide, as well as means for positively insuring removal of the caps and preventing jamming.

The receiving chute 79 is substantially closed and is inclined as illustrated, and has one end beveled as at 80 and projecting sufficiently close to the wheel to pick off the caps carried thereby, as will be clear from an examination of Figures 1 and 2, and at such point that their open ends are upward.

The caps upon being received in the inclined chute, pass downwardly by gravity and a selector finger 81 is disposed in the chute to pass the caps to separate channels 82 and 83. This selector finger 81 is freely pivoted and has projections 85 and 86 on each side which are engaged by the caps and alternately move the finger from one side to another, so as to direct alternate caps into the chutes 82 or 83. The chutes 82 and 83 deposit the caps with their open ends upward upon a suitable conveyor 87 from whence they are carried to a liner inserting machine or other instrumentality. It will be noted that the transferring mechanism consisting of the shelf, wheel and chute cooperate to present the cap to the conveyor face upwards, so that it is not necessary to turn the cap for the purpose of inserting a liner by the usual mechanism.

Associated with the magnetic pick-up roller 78 are a pair of rotating picker members 88, as shown in Figures 1 and 2, which by reason of a pulley connection 89 with the wheel 78 are caused to rotate. These picker members 88 have a plurality of radially extending flexible fingers 89', which extend through openings into the respective chutes 82 and 83. The constantly rotating fingers will engage any caps in the respective chutes to prevent possible clogging, should this for any reason occur.

Any suitable prime mover may be employed for operating the mechanism of this invention, but I propose to use an ordinary electric motor driving a shaft 90 and carrying a gear 91, meshing with the gear 18.

The means for operating the wheel 78 can be connected to this shaft by suitable gearing or pulley mechanism as illustrated at 92 and, as stated, the picker members are operated by a pulley mechanism 89' from the drive shaft of the magnetic wheel.

The chute 79 and shelf construction may take the form of an integral casting supported on the base by a bracket as at 94 and bolted to the ring 19 by the bolts 76'. The upstanding frame member 30, to which the lever 29 is pivotally secured, is formed as an element of this casting.

Referring to Figure 11, a member 95 may be mounted on the die 55 having a cam surface 96 for pushing the wired edge upwardly during the forming of the thread. This cam surface may be integral with the member 95 or may be secured thereto by screw 95' as a separate part, if desired.

It is not preferred to use such a construction, since it is, in most cases, unnecessary, but in some instances it has been found desirable to assist the shrinking or folding of the metal during the threading operation by providing such a cam structure as will act to assist the shrinking and folding effect.

It is to be noted that the end of the cap is acted upon by the cam surface 96 while the cap skirt is supported from within, i. e., the shaping instrumentality or die comprised in the mandrel is within the cap and supports the interior wall of the skirt and the thread. This method is to be distinguished from methods heretofore disclosed in which endwise pressure is exerted upon a cap skirt having a thread, partially formed, but without internal support for the thread. In the present method the thread is internally supported during the application of endwise pressure and thereby the desired predetermined cross-sectional shape of the thread is insured, and any tendency toward collapse which might result from endwise pressure at any point of the thread is prevented.

It is believed that the construction of the machine has now been sufficiently described and to indicate briefly its operation, the cap blanks are stamped in the usual machine and automatically fed to the gravity chute 26, whence a cap is held at the inclined mouth thereof by the finger or lever 37, which projects sufficiently far into the cap path to act as a stop.

Power having been imparted to the shaft 90, the gear 18 is caused to rotate and a mandrel displaces the disc 31, thereby retracting the finger or stop 37, permitting the cap to slide out of the mouth 40 and tilt to be caught by and seated upon the adjacent mandrel which is rotated to position by its gear carriage 18. As the finger or stop 37 is retracted the lever or stop 33 is thrown into position across the path of caps in the chute to prevent the feeding of another cap and since the mandrel has now moved away from disc 31 and has allowed the lever 29 to be retracted by the spring 39, the lever 37 is again thrown to stop position and the lever 33 is retracted out of stop position.

The cap blank is of greater diameter than the mandrel and having been received on the mandrel, is carried in a circular direction by the carriage or gear 18 and caused to rotate by reason of the engagement of the gear 25 with the "Sun" gear 18.

In the first segment the cap is firmly held by the knurled portion of the mandrel and the roughened portion of the fixed segmental die member, at the same time the other fixed segmental die member cooperating with a die member on the mandrel to produce the curl shown in Figure 10. That is to say, the flange of the blank is partially curled during its bodily movement and rotational movement along the fixed path of travel in contact with the first segment.

As hereinbefore stated, the cap makes a complete revolution during its traverse of the first segment, so that this curl is completed as the cap enters the second segment, as shown in Figure 10 at 47. In the second segment, the curl is finished to produce a wired edge, while similarly held by the roughened fixed segmental die member and the knurled head of the mandrel, as shown at 48, in Figure 10. Thus during its bodily and rotational movement past the second segment, the flange, as shown in Figure 10, is completely curled.

The cap having the completely formed curled or beaded edge continues its bodily movement in a predetermined path and its simultaneous rotational movement to form a knurl at the upper portion of the cap skirt. At the same time, the thread is formed through cooperation of the respective dies on the mandrel and on the fixed segment 55 and it will be observed that this thread is produced by a folding and bending of the material of the skirt blank and that the cap is supported for this free shrinking throughout its movement in the thread forming segment, so that by no possibility is the metal stretched or distended during the forming of the thread. In other words, the thickness of the material remains uniform throughout the skirt and thread portions, eliminating any sources of weakness or thin areas which would produce cracking or which would mar a finished cap.

At this point, it should be stated that the cap may be finished before its introduction into the machine as by a lacquer coating, a lithograph finish, printing or any of the other usual methods of decoration or ornamentation and that in passing through the machine, this finish is not interfered with.

In the thread forming segment, it will be observed that since free shrinking is permitted at all times, it is possible to produce a relatively deeper thread than has heretofore been possible and without stretching the metal and such thread will have a hook-shaped shelf or extension permitting it to engage deeper beneath the ledge of a container thread to produce a greater sealing value. As shown in Figure 12, the skirt presents in cross section substantially the contour of a fish hook and the shelf at its inner extremity is somewhat flattened or but slightly curved to provide in effect a hook which, in actual use, permits the thread to engage well under the ledge of the container thread.

As the completed cap passes into the cap removing zone, the lifting mechanism associated with each mandrel is operated to raise the cap and deposit it upon the shaft 76, whereupon it is attracted by its top or closed end to the transfer wheel and deposited with its open end exposed to a chute from which it is passed to the conveyor 87 with its open end in position to receive the usual liner, which is automatically applied without further manipulation, and the finished articles delivered automatically to a shipping package.

It will be observed that the operation of the apparatus from the blank forming to the packaging is entirely automatic and the action of the respective parts is so timed that the feed, the forming of the completed article and the removal can be carried on consecutively permitting production of the finished articles in tremendous quantities and with great speed. This is accomplished, of course, by varying the gear ratio of the planetary gearing construction disclosed and controlling the feed of blanks from the blank forming machine.

The gear 91 may be provided with an integral hub 100 carrying a shear pin 101, which engages the gear 91, the latter being loosely disposed on the shaft 90. In this manner, should the machine jam for any reason, the shear pin will break and so disconnect the gear 91 from the shaft 90, to stop the operation.

It is an important feature of the invention that the blanks being of larger diameter than the diameter of the mandrels are eccentrically disposed thereon during the respective forming operations. so that the metal of the blank is free to conform to the progressive action of the dies, and without objectionable strain upon or stretching of the metal, assuring that the completed cap will be free of weakened areas. In this manner, cracking of the cap material will be avoided and lithographed or otherwise finished or coated blanks can be safely passed through the machine without fear of marring the finish.

Further, it will be noted that the gear 18 carrying the mandrels is adapted to rotate in a counter-clockwise direction in forming the cap, and that the thread is produced progressively downward of the skirt as shown in Figures 2, 4 and 6 permitting free shrinkage of the skirt without stretching or distending the metal.

In Figure 13, I have illustrated in detail the member 95. This member, as shown, is provided with the short inclined portion 96 which engages and pushes the wired edge up simultaneously with the engagement of the shell by the thread forming dies. Thus the shrinking or folding of the shell to form the thread is assisted positively.

The member 95 extends the length of the thread forming segment or die 55 and its upper edge is straight for the major portion of its length to act substantially as the bottom or one wall of the die producing a uniform shrinkage.

In Figure 12, I have shown the original hat-shaped shell or blank in broken lines and the final complete cap in full lines indicating the extent of the shrinkage of the cap. The original blank as shown has a flange and a skirt and the final article is formed with a knurled portion at its top and a beaded edge at the other end, and intermediate the beaded edge and the knurled portion is disposed a continuous or spiral thread.

Referring to Figure 3, of the drawings, attention is called to the position of the "Sun" gear 17, the rotary gear 18 and the mandrel supporting stem 23 with its associated parts.

By the present construction, only a minimum amount of the stem is exposed above its bearing to support the shell or blank and the rotary gear is of large diameter and mounted upon a large bearing 15 relatively close to the stem 23 and its bearing. Furthermore, the gear 25 being located below the large gear 18 to engage the "Sun" gear 17, which is likewise disposed below the large gear any tendency caused by the inter-engagement of the die members to rock the stem 23 is effectively prevented and likewise by reason of the mounting of the large gear such rocking or bending will be absorbed without causing wear upon the parts.

With the present invention, however, wherein the "Sun" gear is disposed below or at one side of the large gear and the die members above the large gear with the large gear rotating upon a broad bearing close to the bearing for the stem 23 twisting or bending of the stem 23 is substantially reduced and absorbed and there is but little opportunity, if any, for twisting, bending or wear to occur between the rotating gear and its bearing. In this manner, there is produced a very uniform article, since the position of the stem 23 and its associated die member will always remain accurate with respect to the fixed die members or segments.

It will also be observed upon reference to Figure 3 that the "Sun" gear 17 and the gear 25 are protected and shielded from any metal or other particles which may be thrown off from the cap blank during its rotation on the mandrels about the segments.

What I claim is:

1. The method of making in a single operation curled edge screw caps having a skirt formed with a curled edge and a continuous thread above the curled edge which comprises imparting simultaneously both a bodily movement along a predetermined path and rotational movements to a plurality of hat-shaped blanks, each having a skirt and a flange, and during said movements in immediately successive steps forming the flange into a curled edge and bending the blank skirt to form a continuous thread while leaving the end of the skirt free to permit free shrinkage of the material of the skirt.

2. The method of making in a single operation curled edge screw caps having a skirt formed with a curled edge and a continuous thread above the curled edge which comprises imparting simultaneously both a bodily movement along a predetermined path and rotational movements to a plurality of hat-shaped blanks, each having a skirt and a flange, and during said movements in immediately successive steps forming the flange into a curled edge and then bending the blank skirt to form a continuous thread while leaving the curled edge free to permit free shrinkage of the material of the skirt.

3. The method of making in a single operation curled edge screw caps having a skirt formed with a curled edge and a continuous thread above the curled edge which comprises imparting simultaneously both a bodily movement along a predetermined path and rotational movements to a plurality of hat-shaped blanks, each having a skirt and a flange, and during said movements in immediately successive steps forming the flange into a curled edge and bending the blank skirt to form a continuous thread while leaving the end of the skirt free to permit free shrinkage of the material of the skirt and during one of said steps knurling the skirt.

4. The method of making in a single operation curled edge screw caps having a skirt formed with a curled edge and a continuous thread above the curled edge which comprises imparting simultaneously both a bodily movement along a predetermined path and rotational movements to a plurality of hat-shaped blanks, each having a skirt and a flange, and during said movements in immediately successive steps forming the flange into a curled edge and bending the blank skirt to form a continuous thread while leaving the end of the skirt free to permit free shrinkage of the material of the skirt and during said thread forming step knurling the skirt.

5. The method of making in a single operation curled edge screw caps having a skirt formed with a curled edge and a continuous thread which comprises imparting simultaneously both a bodily movement along a predetermined path and rotational movements to a plurality of hat-shaped blanks, each having a skirt and a flange, and during said movements in immediately successive steps forming the flange into a curled edge and bending the blank skirt to form a continuous thread while permitting free shrinkage of the material of the skirt and during said thread forming step applying pressure to the end of the skirt to assist the shrinking action.

6. The method of making in a single operation curled edge screw caps having a skirt formed with a curled edge and a continuous thread which comprises imparting simultaneously both a bodily movement along a predetermined path and rotational movements to a plurality of hat-shaped blanks, each having a skirt and a flange, and during said movements in immediately successive steps forming the flange into a curled edge and then bending the blank skirt to form a continuous thread while permitting free shrinkage of the material of the skirt and during said thread forming step applying pressure to the end of the skirt to assist the shrinking action.

7. The method of making in a single operation curled edge screw caps having a skirt formed with a curled edge and a continuous thread which comprises imparting simultaneously both a bodily movement along a predetermined path and rotational movements to a plurality of hat-shaped blanks, each having a skirt and a flange, and during said movements in immediately successive steps forming the flange into a curled edge and bending the blank skirt to form a continuous thread while permitting free shrinkage of the material of the skirt, during one of said steps knurling the skirt, and during said thread forming step applying pressure to the end of the skirt to assist the shrinking action.

8. The method of making in a single operation curled edge screw caps having a skirt formed with a curled edge and a continuous thread which comprises imparting simultaneously both a bodily movement along a predetermined path and rotational movements to a plurality of hat-shaped blanks, each having a skirt and a flange, and during said movements in immediately successive steps forming the flange into a curled edge and bending the blank skirt to form a continuous thread while permitting free shrinkage of the material of the skirt, during said thread forming step knurling the skirt, and during said thread forming step applying pressure to the end of the skirt to assist the shrinking action.

9. The method of making in a single operation curled edge screw caps having a skirt formed with a wire edge and a continuous thread above the curled edge which comprises imparting simultaneously a bodily movement along a pretermined path and eccentric rotational movements to a plurality of hat-shaped blanks, each having a skirt and a flange and during said movements and in immediately successive steps forming the flange into a curled edge and bending the skirt to form a thread while leaving the end of the skirt free to permit free shrinkage of the material of the skirt blank.

10. The method of making in a single operation curled edge screw caps having a skirt formed with a curled edge and a continuous thread above the curled edge which comprises imparting simultaneously both a bodily movement along a predetermined path and rotational movements to a plurality of hat-shaped blanks supported from within during such movements, each of said blanks having a skirt and flange and during said movements in immediately successive steps forming the flange into a curled edge and bending the blank skirt to form a continuous thread while permitting free shrinkage of the material of the skirt, and inverting the caps as formed to a position to receive a liner.

11. That improvement in the art of making a screw cap having a spirally threaded skirt which consists in bending the skirt and forming a screw-thread therein by means which forms and fits into the spirally formed thread and assisting the thread-forming operation and reducing the height of the skirt by exerting endwise pressure upon the end of the skirt, while the means is within the threads and as the spiral thread is formed by said means.

12. The method of making a screw cap having a skirt provided with a thread which consists in supporting the cap from within and imparting a bodily movement and simultaneous rotational movement to the cap along a predetermined path, forming a thread during such bodily and rotational movement, and exerting endwise pressure upon the end of the skirt while the cap is thus supported.

13. The method of making from a cupped blank a screw cap having a skirt formed with a continuous thread which comprises imparting simultaneously both a bodily movement along a predetermined path and rotational movements to a plurality of cupped blanks, and during said movements bending the skirt and forming progressively and continuously beginning at one end and finishing at the other the entire of a continuous thread in the skirt along the entire formed thread from the upper portion of the skirt toward the free edge thereof.

14. The method of making from a cupped blank a screw cap having a skirt formed with a continuous thread which comprises imparting simultaneously both a bodily movement along a predetermined path and rotational movements to a plurality of cupped blanks, and during said movement bending the skirt and forming progressively and continuously beginning at one end and finishing at the other the entire of a continuous thread in the skirt along the entire formed thread from the upper portion of the skirt toward the free edge thereof while leaving the end of the skirt during the forming operation free to permit free shrinkage of the material of the skirt.

15. The method of making curled edge screw caps having a skirt formed with a curled edge and a continuous thread in the skirt above the curled edge which comprises imparting simultaneously both a bodily movement along a predetermined path and rotational movements to a plurality of cupped blanks, and during said movements forming a curled edge and then bending said skirt and forming progressively and continuously beginning at one end and finishing at the other the entire of a continuous thread in the skirt along the entire formed line of helix from the upper portion of the skirt toward the free edge.

16. The method of making curled edge screw caps having a skirt formed with a curled edge and a continuous thread in the skirt above the curled edge which comprises imparting simultaneously both a bodily movement along a predetermined path and rotational movements to a plurality of cupped blanks, and during said movements forming a curled edge and then bending said skirt and forming progressively and continuously beginning at one end and finishing at the other the entire of a continuous thread in the skirt along the entire formed line of helix from the upper portion of the skirt toward the free edge while leaving the curled end of the skirt free to permit free shrinkage of the material of the skirt during the thread-forming operation.

17. An apparatus of the class described comprising a feeding mechanism for cupped cap blanks, a rotary mandrel supporting carriage, individually rotating mandrels thereon for receiving a blank, die sections cooperating with said mandrels to form in sequence a curled edge and continuously and progressively beginning at one end and finishing at the other the entire of a continuous-thread in the skirt of the blank above the curled edge, means for rotating the mandrel supporting carriage past the die sections, means for rotating the mandrels to cause each mandrel to perform at least one complete rotation during the traverse of the carriage past each die section, and automatic means for lifting the cap from a mandrel.

18. An apparatus of the class described comprising a feeding mechanism for cupped cap blanks, a rotary mandrel supporting carriage, rotating mandrels thereon for receiving a blank, die sections cooperating with said mandrels to form a continuous-thread cap from the blank, means for rotating the mandrel supporting carriage past the die sections, means for rotating the mandrels to cause each mandrel to perform at least one complete rotation during the traverse of the carriage past each die section, and means on the mandrels and die sections for forming the cap with a curled edge and thereafter with a thread and a knurled portion and permitting the blank skirt to shrink freely during production of the thread.

19. An apparatus of the class described comprising a feeding mechanism for cap blanks, a rotary mandrel supporting carriage, rotating mandrels thereon for receiving a cupped blank, die sections cooperating with said mandrels to form a continuous-thread cap from the blank, means for rotating the mandrel supporting carriage past the die sections, means for rotating the mandrels to cause each mandrel to perform at least one complete rotation during the traverse of the carriage past each die section, one of said sections having means for curling the free end of the blank and for holding the blank fixed against all but rotary motion on said mandrel, and a second section having means for simultaneously knurling the blank and forming the same with a continuous-thread above said curled end, said second section having a single, continuous, projecting thread-forming track thereon adapted to continuously and progressively form the entire thread from beginning to end.

20. An apparatus of the class described comprising a feeding mechanism for cupped cap blanks, a rotary mandrel supporting carriage, rotating mandrels thereon automatically actuating the feeding mechanism and for receiving a blank, die sections cooperating with said mandrels to form a complete continuous-thread cap from the blank, means for rotating the mandrel supporting carriage past the die sections, means for rotating the mandrels to cause each mandrel to perform at least one complete rotation during the traverse of the carriage past each die section, and means on the mandrels and die sections for forming the cap with a curled edge and thereafter with a continuous thread and a knurled portion, said last-mentioned means permitting the blank skirt to shrink freely during the production of the thread.

21. A cap forming machine comprising a movable carriage, a plurality of cap mandrels on said carriage and means associated with said carriage for forming a cap during the movement of said carriage and means for removing a cap from the carriage upon the completion of the forming operation, said last mentioned means comprising movable members disposed at the sides of each of said mandrels, means for raising and lowering the members, said members upon initially engaging said means rising to receive and carry a cap free of the carriage and means acting to lower the members and deposit the cap in a position to be collected.

22. A machine of the class described comprising a base having a peripheral bearing, die members on the base at one side, a fixed gear on the base at the opposite side, a mandrel supporting carriage of substantially ring-form rotatably mounted on the peripheral bearing of the base and having a substantially housed bearing therein between said die members and said gear, a mandrel rotatably supported on the carriage, one end of the mandrel having a die member cooperating with the die member on the base and the other end having a gear engaging with the gear on the base to rotate the mandrel, said carriage bearing on the base being substantially closer to the mandrel bearing in the carriage than to the center of said base, whereby the strain upon the mandrel is distributed upon opposite sides of the carriage to maintain the mandrel in proper aligned position.

23. A machine of the class described comprising a base, a die on one side thereof and a fixed gear on the opposite side thereof, a large peripheral bearing on the base, a carriage of substantially ring-form rotatably mounted on the large bearing on the base and substantially housed within the confines thereof between said die member and said gear, a bearing on the carriage, a mandrel shaft rotatably mounted in said bearing on the carriage relatively close to the bearing of the carriage on the base, said mandrel shaft having at one end a die member cooperating with the die member on the base and at the other end a gear engaging the gear on the base to rotate the mandrel, said carriage bearing being disposed substantially closer to the mandrel shaft bearing in the carriage than to the center of the base, whereby strain upon the mandrel due to inter-engagement of said dies will be absorbed by the large bearing for the carriage and said fixed gear.

24. A machine for manufacturing screw caps having a skirt formed with a curled edge and a continuous thread above the curled edge, comprising means for moving simultaneously both bodily along a predetermined path and rotationally a plurality of hat-shaped blanks, each having a skirt and a flange, means effective during said movements for forming the flange into a curled edge, and means operative immediately in succession to said curling means and during said movements to form a continuous-thread in the skirt, said last-mentioned means comprising a section over which the blank is rotated and having a single projecting thread-forming track thereon.

25. A machine for manufacturing screw caps having a skirt formed with a curled edge and a continuous-thread above the curled edge comprising means for moving simultaneously both bodily along a predetermined path and rotationally a plurality of hat-shaped blanks, each having a skirt and a flange, means effective during said movements for forming the flange into a curled edge, means operative immediately in succession to said curling means and during said movements to form a continuous-thread in the skirt, said last-mentioned means comprising a section over which the blank is rotated and having projecting means for forming continuously and progressively beginning at one end and finishing at the other the entire of the formed continuous thread, and means for knurling the skirt above the thread.

26. A machine for manufacturing screw caps having a skirt formed with a curled edge and a continuous-thread above the curled edge comprising means for moving simultaneously both bodily along a predetermined path and rotationally a plurality of hat-shaped blanks, each having a skirt and a flange, means effective during said movements for forming the flange into a curled edge, means operative immediately in succession to said curling means and during said movements to form a continuous thread in the skirt, said last-mentioned means comprising a section over which the blank is rotated and having means for forming progressively beginning at one end and finishing at the other the entire of a continuous-thread while permitting throughout said operation the curled skirt to shrink freely, and means operative simultaneously with said thread forming means for knurling the skirt above the thread.

27. A machine for manufacturing screw caps having a skirt formed with a curled edge and a continuous-thread above the curled edge comprising means for moving simultaneously both bodily along a predetermined path and rotationally a plurality of hat-shaped blanks, each having a skirt and a flange, means effective during said movements for forming the flange into a curled edge, and means operative immediately in succession to said curling means and during said movements to form a continuous-thread in the skirt while maintaining the curled end of the skirt free to permit free shrinkage of the material of the skirt during the forming of the thread.

28. A machine for manufacturing screw caps having a skirt formed with a curled edge and a continuous-thread above the curled edge comprising means for moving simultaneously both bodily along a predetermined path and rotationally a plurality of hat-shaped blanks, each having a skirt and a flange, means effective during said movements for forming the flange into a curled edge, means operative immediately in succession to said curling means and during said movements to form a continuous-thread in the skirt, while maintaining the curled end of the skirt free to permit free shrinkage of the material of the skirt during the forming of the thread, and means for knurling the skirt above the thread.

29. A machine for manufacturing screw caps having a skirt formed with a curled edge and a continuous-thread above the curled edge comprising means for moving simultaneously both bodily along a predetermined path and rotationally a plurality of hat-shaped blanks, each having a skirt and a flange, means effective during said movements for forming the flange into a curled edge, means operative immediately in succession to said curling means and during said movements to form a continuous-thread in the skirt while maintaining the curled end of the skirt free to permit free shrinkage of the material of the skirt during the forming of the thread, and means operative simultaneously with the thread forming means for knurling the skirt above the thread.

30. A machine for manufacturing screw caps having a skirt formed with a curled edge and a continuous thread above the curled edge comprising means for moving simultaneously both bodily along a predetermined path and rotationally a plurality of hat-shaped blanks, each having a skirt and a flange, means effective during said movements for forming the flange into a curled edge, means operative immediately in succession to said curling means and during said movements to form a continuous-thread in the skirt, and means for exerting endwise pressure on the skirt during the formation of the thread.

31. In a machine for manufacturing screw caps having a skirt provided with a thread, means for supporting and rotating a blank having a depending skirt, means for forming and fitting into a spiral thread in the blank skirt, and means for assisting the forming means in the thread-forming by exerting endwise pressure upon the end of the skirt and reducing the height of the skirt while the said forming means is within the thread.

32. In a machine for manufacturing screw caps having a skirt provided with a thread, means for supporting and rotating a blank having a depending skirt, means for forming and fitting into a spiral thread in the blank skirt, and means for assisting the forming means in the thread-forming by exerting endwise pressure upon the skirt and reducing the height of the skirt while the said forming means is within the thread, and as the spiral thread is formed by said forming means.

33. In a machine for manufacturing screw caps having a skirt formed with a continuous thread, means for supporting from within a cap blank having a depending skirt, means for imparting simultaneously bodily and rotational movements to the blank, means for forming a thread in the skirt during said movements, said last mentioned means including a die which fits into and conforms to the thread, and means for assisting the die in the thread-forming by exerting endwise pressure upon the end of the skirt and reducing the height of the skirt while said die is within the thread.

34. In a machine for manufacturing screw caps having a skirt formed with a continuous thread, means for supporting from within a cap blank having a depending skirt, means for imparting simultaneously bodily and rotational movements to the blank, means for forming a thread in the skirt during said movements, said last mentioned means including a die which fits into and conforms to the thread, and means for assisting the die means in forming the thread by exerting endwise pressure upon the end of the skirt and reducing the height of the skirt while said die is within the thread and as the thread is being formed.

35. In a machine for manufacturing screw caps having a skirt formed with a continuous thread, means for supporting from within a cap blank having a depending skirt, means for imparting simultaneously bodily and rotational movements to the blank, means for forming a thread in the skirt during said movements, means for curling the edge of the skirt during said movements, and means for automatically removing the cap from said supporting means at the end of its bodily movement and turning the cap as formed to a position with its skirt upwardly directed whereby to receive a liner.

36. In a machine for manufacturing screw caps having a skirt formed with a continuous thread, means for supporting from within a cap blank having a depending skirt, means for imparting simultaneously bodily and rotational movements to the blank, means for forming a thread in the skirt during said movements, means for curling the edge of the skirt during said movements, and means for automatically removing the cap from said supporting means at the end of its bodily movement and turning the cap as formed to a position with its skirt upwardly directed whereby to receive a liner, said last named means including a magnetic pick-up mechanism.

37. In a machine for manufacturing screw caps having a skirt formed with a continuous thread, means for supporting from within a cap blank having a depending skirt, means for imparting simultaneously bodily and rotational movements to the blank, means for forming a thread in the skirt during said movements, means for curling the edge of the skirt during said movements, and means for automatically removing the cap from said supporting means at the end of its bodily movement and turning the cap as formed to a position with its skirt upwardly directed whereby to receive a liner, said last-named means including a magnetic pick-up mechanism comprising a rotary wheel adapted to carry said cap through an arcuate path.

38. In a machine for manufacturing screw caps having a skirt formed with a continuous thread, means for supporting from within a cap blank having a depending skirt, means for imparting simultaneously bodily and rotational movements to the blank, means for forming a thread in the skirt during said movements, means for curling the edge of the skirt during said movements, and means for automatically removing the cap from said supporting means at the end of its bodily movement and turning the cap as formed to a position with its skirt upwardly directed whereby to receive a liner, said last-named means including a magnetic pick-up mechanism comprising a rotary wheel adapted to carry said cap through an arcuate path and a chute into which said wheel discharges the turned cap.

39. A machine for manufacturing screw caps having a skirt formed with a curled edge and a continuous thread above the curled edge comprising die means for moving simultaneously both bodily along the predetermined path and rotationally a plurality of hat-shaped blanks, each having a skirt and a flange, fixed die means along said path for cooperating with said movable die means, said means effective during relative movement thereof for forming the flange into a curled edge and operative immediately in succession to said curling operation and during said movement to form a continuous thread in the skirt, and means for exerting endwise pressure upon the free edge of the cap and reducing the height of the cap skirt.

40. In a machine for manufacturing screw caps having a skirt formed with a curled edge and a continuous thread above the curled edge comprising die means for moving simultaneously both bodily along a predetermined path and rotationally a plurality of hat-shaped blanks, each having a skirt and a flange, fixed die means along said path for cooperating with said movable die means, said means effective during relative movement thereof for forming the flange into a curled edge and operative immediately in succession to said curling operation and during said movement to form a continuous thread in the skirt, and means operating simultaneously with said thread-forming means for exerting endwise pressure upon the free edge of the cap.

41. A machine for manufacturing screw caps having a skirt formed with a curled edge and a continuous thread above the curled edge comprising die means for moving simultaneously both bodily along a predetermined path and rotationally a plurality of hat-shaped blanks, each having a skirt and a flange, fixed die means along said path for cooperating with said movable die means, said means effective during relative movement thereof for forming the flange into a curled edge and operative immediately in succession to said curling operation and during said movement to form a continuous thread in the skirt, automatic means for removing the completed cap from the machine and a rotary pick-up member cooperating with said last means to dispose the cap in position to receive a liner.

42. In a machine for manufacturing caps, means for supporting a plurality of skirted cap blanks each having a flange at the end of the skirt, means for moving said blanks bodily along a predetermined path and for imparting rotational movement to said blanks during said bodily movement, means for bending each cap flange during said movements to form a curled edge, and means for removing the caps as formed at the end of said path, said last-mentioned means comprising a rotating wheel disposed at one side of the plane of bodily movement of the blanks and having holding means associated therewith, said wheel being rotatable on an axis disposed at substantially a right angle to the axes of rotation of said blanks.

43. In a machine for manufacturing caps, means for supporting a plurality of skirted cap blanks, means for moving said blanks bodily along a predetermined path and for imparting rotational movement to said blanks during said bodily movement, means for bending each cap skirt during said movements and forming cap retaining means on the skirt, and means for removing the caps as formed at the end of said path, said last-mentioned means comprising a rotating wheel disposed on one side of the plane of bodily movement of the blanks and having magnetic holding means associated therewith.

44. In a machine for manufacturing caps, means for supporting a plurality of skirted cap blanks, means for moving said blanks bodily along a predetermined path and for imparting rotational movement to said blanks during said bodily movement, means for bending each cap to form a curled edge thereon during said movements, and means for removing the caps as formed at the end of said path, said last-mentioned means comprising a rotating wheel disposed above the plane of bodily movement of said blanks on an axis substantially perpendicular to the axes of rotation of said blanks and having holding means associated therewith and a conveyor associated with said wheel adapted to convey the formed caps therefrom.

45. In a machine for manufacturing caps, means for supporting a plurality of skirted cap blanks, means for moving said blanks bodily along a predetermined path and for imparting rotational movement to said blanks during said bodily movement, means for bending each cap during said bodily movement to form a curled edge, and means for removing the caps as formed at the end of said path, said last-mentioned means comprising a rotating wheel having magnetic holding means associated therewith and a conveyor associated with said wheel adapted to convey the formed caps therefrom.

46. A machine for manufacturing screw caps comprising means for moving simultaneously both bodily along a predetermined path and rotationally a plurality of cupped blanks each having a skirt, and means operative during said movements to form a continuous screw-threaded in said blank skirt, said last-mentioned means comprising a die over which the blanks are rotated in their bodily movement and having a single projecting screw-thread-forming track adapted to form the entire screw-threaded progressively and continuously both circumferentially and lengthwise of the skirt as the cap is rotated.

47. A machine for manufacturing screw caps comprising means for moving simultaneously both bodily along a predetermined path and rotationally a plurality of cupped blanks each having a skirt, and means operative during said movements to form a continuous screw-thread in said blank skirt, said last-mentioned means comprising a die over which the blanks are rotated in their bodily movement and having a single projecting screw-thread-forming track adapted to form the entire thread progressively and continuously both circumferentially of the skirt and from the top of the cap blank toward the free edge of the skirt.

48. A machine for manufacturing screw caps comprising means for moving simultaneously both bodily along a predetermined path and rotationally a plurality of cupped blanks each having a skirt, and means operative during said movements to form a continuous screw-thread in said blank skirt, said last-mentioned means comprising a die over which the blanks are rotated and having a single projecting screw-thread forming track adapted to form the entire screw-thread progressively and continuously, as the cap is rotated, both circumferentially of the skirt and from the top of the cap blank toward the free edge of the skirt, said two means being disposed to permit the cap skirt to shrink freely in height during the thread forming operation.

49. A machine for manufacturing screw caps having a skirt formed with a curled edge, and a continuous thread above the curled edge comprising means for moving simultaneously both bodily along a predetermined path and rotationally a plurality of hat-shaped blanks, each having a skirt and a flange, means effective during said movements for forming the flange into a curled edge, and means operative immediately in succession to said curling means and during said movements to form a continuous thread in the skirt while maintaining the curled end of the skirt free to permit free shrinkage of the material of the skirt during the forming of the thread, said last-mentioned means comprising a die section over which the cap blank is rotated and having a single projecting thread-forming track thereon adapted to form the entire of the thread continuously and progressively.

50. A machine for manufacturing screw caps having a skirt formed with a curled edge and a continuous thread above the curled edge comprising means for moving simultaneously both bodily along a predetermined path and rotationally a plurality of hat-shaped blanks each having a skirt and a flange, means operative during said movements to form a continuous thread in the skirt, said means comprising a die section over which the blank is rotated during said movements and having a single projecting thread-forming track thereon adapted to continuously and progressively form the entire of the thread, and means operative during said movements for forming the flange into a curled edge, said threading and curling means being operative immediately in succession.

51. A machine for manufacturing screw caps having a skirt formed with a curled edge and a continuous thread above the curled edge comprising means for moving simultaneously both bodily along a predetermined path and rotationally a plurality of hat-shaped blanks, each having a skirt and a flange, means operative during said movements to form a continuous thread in the skirt, said means comprising a die section over which the blank is rotated during said movements and having a single projecting thread-forming track thereon adapted to continuously and progressively form the entire of the thread, and means operative during said movements for forming the flange into a curled edge, said threading and curling means being operative immediately in succession and the curling means being disposed in advance of the threading means.

52. In a machine for manufacturing screw caps from cupped blanks, a movable carriage having a plurality of individually rotatable blank holding mandrels, means for individually rotating the mandrels during the movement of the carriage, a fixed screw-thread forming die section over which the blanks are rotated a complete revolution in the movement of the carriage and mandrels, and a single projecting screw-thread forming track on said section for forming continuously and progressively the entire of a continuous screw-thread along the entire line of the thread extending both circumferentially of the skirt and lengthwise thereof.

53. In a machine for manufacturing screw caps from cupped blanks, a movable carriage having a plurality of individually rotatable blank holding mandrels, means for individually rotating the mandrels during the movement of the carriage, a fixed die section over which the blanks are rotated a complete revolution in the movement of the carriage and mandrels, and a single projecting thread-forming track on said section for forming continuously and progressively the entire line of a continuous thread along the entire line of helix thereof, and a second die section over which the blank is rotated in the movements of the carriage and mandrels, said second section having means for curling the edge of the said blank.

54. In a machine for manufacturing screw caps from cupped blanks, a movable carriage having a plurality of individually rotatable blank holding mandrels, means for individually rotating the mandrels during the movement of the carriage, a fixed die section over which the blanks are rotated a complete revolution in the movement of the carriage and mandrels, and a single projecting thread-forming track on said section for forming continuously and progressively the entire of a continuous thread along the entire line of helix thereof, and a second die section over which the blank is rotated in the movements of the carriage and mandrels, said second section having means for curling the edge of the said blank, said curling and threading means being operative immediately in succession.

55. In a machine for manufacturing screw caps from cupped blanks, a movable carriage having a plurality of individually rotatable blank holding mandrels, means for individually rotating the mandrels during the movement of the carriage, a fixed die section over which the blanks are rotated a complete revolution in the movement of the carriage and mandrels, and a single projecting thread-forming track on said section for forming continuously and progressively the entire of a continuous thread along the entire line of helix thereof, and a second die section over which the blank is rotated in the movements of the carriage and mandrels, said second section having means for curling the edge of the said blank, said curling and threading means being operative immediately in succession, and the curling section being disposed in advance of the thread-forming section.

56. A machine for forming caps comprising a carriage having a plurality of mandrels thereon for cupped blanks, means for moving said carriage, means operative in the movement of said carriage to rotate said mandrels, and means for operating upon the skirt of the cap blanks during said movements to form the skirt, and means operative upon completion of the forming operation to remove automatically the formed blanks from the mandrels, said last-mentioned means comprising a member disposed at the side of each mandrel, means engageable in the rotation of said carriage to lift said members whereby to raise the formed cap therefrom; means to receive said cap from said members when the latter are raised and serving to retain the cap when said members are lowered, and movable pick-up means for removing the lifted caps from said last-mentioned means.

57. A machine for forming caps comprising a carriage having a plurality of mandrels thereon for cupped blanks, means for moving said carriage, means operative in the movement of said carriage to rotate said mandrels, and means for operating upon the skirt of the cap blanks during said movements to form the skirt, and means operative upon completion of the forming operation to remove automatically the formed blanks from the mandrels, said last-mentioned means comprising a member disposed at the side of each mandrel, means engageable in the rotation of said carriage to lift said the members whereby to raise the formed cap therefrom; means to receive said cap from said members when the latter are raised and serving to retain the cap when said members are lowered, and movable pick-up means including a rotary wheel for removing the lifted caps from said last-mentioned means.

58. A machine for manufacturing caps comprising a base having remote from its center a circumferentially extending bearing, a rotatable carriage of substantially ring-form mounted on said bearing, a plurality of mandrel shafts extending through said carriage substantially in parallelism with the axis of the carriage and with the surface of said bearing, said carriage bearing being disposed substantially closer to the axes of said shafts than to the center of said base, means for revolving said carriage, means on said base for individually rotating said mandrel shafts as said carriage is revolved, said means being disposed at one side of said carriage, and means on said base for engaging and forming cap blanks carried by said mandrel shafts as the latter are revolved with said carriage.

59. A machine for manufacturing caps comprising a base having remote from its center a circumferentially extending bearing, a rotatable carriage of substantially ring-form mounted on said bearing, means at opposite sides of said carriage on said base fitting closely against the sides of said carriage to resist lateral movement thereof, a plurality of mandrel shafts extending through said carriage substantially in parallelism with the axis of the carriage and with the surface of said bearing, said carriage bearing being disposed substantially closer to the axes of said shafts than to the center of said base, means for revolving said carriage, means on said base for individually rotating said mandrel shafts as said carriage is revolved, said means being disposed at one side of said carriage, and means on said base for engaging and forming cap blanks carried by said mandrel shafts as the latter are revolved with said carriage.

60. A machine for manufacturing caps comprising a base having remote from its center a circumferentially extending bearing, a rotatable carriage of substantially ring-form mounted on said bearing, a plurality of mandrel shafts extending through said carriage substantially in parallelism with the axis of the carriage and with the surface of said bearing, said carriage bearing being disposed substantially closer to the axis of said shafts than to the center of said base, means for revolving said carriage, means on said base for individually rotating said mandrel shafts as said carriage is revolved, said means being disposed at one side of said carriage, and means on said base disposed at the other side of said carriage for engaging and forming cap blanks carried by said mandrel shafts as the latter are revolved with said carriage.

61. A machine for manufacturing caps comprising a base having remote from its center a circumferentially extending bearing, a rotatable carriage of substantially ring-form mounted on said bearing, means at opposite sides of said carriage on said base fitting closely against the sides of said carriage to resist lateral movement thereof, a plurality of mandrel shafts extending through said carriage substantially in parallelism with the axis of the carriage and with the surface of said bearing, said carriage bearing being disposed substantially closer to the axes of said shafts than to the center of said base, means for revolving said carriage, means on said base for individually rotating said mandrel shafts as said carriage is revolved, said means being disposed at one side of said carriage, and means on said base disposed at the other side of said carriage for engaging and forming cap blanks carried by said mandrel shafts as the latter are revolved with said carriage.

62. A machine for manufacturing from cupped blanks screw caps of the type having a curled edge and a continuous thread above the edge comprising a base having a peripheral bearing remote from its center, a carriage of substantially ring-form revolubly mounted on said bearing and confined thereon against movement axially of the bearing, a plurality of bearings in said carriage, a plurality of cap-blank mandrel shafts rotatably mounted in said bearings on said carriage substantially paralleling the surface of the bearing on said base and the carriage axis, a fixed gear on said base and gears on said mandrel shafts meshing therewith whereby to rotate said mandrel shafts as the carriage is revolved, said carriage bearing and said mandrel bearings being disposed relatively close to one another along radial lines, means for revolving said carriage on the base, and circumferentially extending segmental die means disposed adjacent the path of said mandrels and over which the cap blanks are rotated as the carriage is revolved, said die having means to form a continuous thread in the cap skirt substantially without stretching the metal thereof.

63. A machine for manufacturing from cupped blanks screw caps of the type having a curled edge and a continuous thread above the edge comprising a base having a peripheral bearing remote from its center, a carriage of substantially ring-form revolubly mounted on said bearing and confined thereon against movement axially of the bearing, a plurality of bearings on said carriage, a plurality of cap-blank mandrel shafts rotatably mounted in said bearings on said carriage and substantially paralleling the surface of the bearing on said base and the carriage axis, a fixed gear on said base and gears on said mandrel shafts meshing therewith whereby to rotate said mandrel shafts as the carriage is revolved, said carriage bearing and said mandrel bearings being disposed relatively close to one another along radial lines, means for revolving said carriage on the base, and die sections fixedly mounted on the base adjacent the path of said mandrels and over which the cap blanks are rotated as the carriage is revolved, one of said die sections having means to curl the edge of the blank and another section having means to form a continuous thread in the skirt above the edge.

64. A machine for manufacturing from cupped blanks screw caps of the type having a curled edge and a continuous thread above the skirt comprising a base having a peripheral bearing remote from its center, a carriage of substantially ring-form revolubly mounted on said bearing and confined thereon against movement axially of the bearing, a plurality of bearings on said carriage, a plurality of cap-blank mandrel shafts rotatably mounted in bearings on said carriage and substantially paralleling the surface of the bearing on said base and the carriage axis, a fixed gear on said base and gears on said mandrel shafts meshing therewith whereby to rotate said mandrel shafts as the carriage is revolved, said carriage bearing and said mandrel bearings being disposed relatively close to one another along radial lines, means for revolving said carriage on the base, and die sections fixedly mounted on the base adjacent the path of said mandrels and over which the cap blanks are rotated as the carriage is revolved, one of said die sections having means to curl the edge of the blank and another section having means to form a continuous thread in the skirt above the edge while leaving the skirt free to shrink freely during the thread-forming.

In testimony whereof I have hereunto set my hand.

ERIC B. KRAMER.

CERTIFICATE OF CORRECTION

Patent No. 1,900,880.                                                                 March 7, 1933.

ERIC B. KRAMER.

It is hereby certified that error appears in the printed specification of the above numbered patent requiring correction as follows: Page 5, line 80, strike out "its" second occurrence; page 14, lines 21 and 26, claim 46, for "screw-threaded" read "screw-thread"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)

mandrel bearings being disposed relatively close to one another along radial lines, means for revolving said carriage on the base, and die sections fixedly mounted on the base adjacent the path of said mandrels and over which the cap blanks are rotated as the carriage is revolved, one of said die sections having means to curl the edge of the blank and another section having means to form a continuous thread in the skirt above the edge while leaving the skirt free to shrink freely during the thread-forming.

In testimony whereof I have hereunto set my hand.

ERIC B. KRAMER.

CERTIFICATE OF CORRECTION

Patent No. 1,900,880.    March 7, 1933.

ERIC B. KRAMER.

It is hereby certified that error appears in the printed specification of the above numbered patent requiring correction as follows: Page 5, line 80, strike out "its" second occurrence; page 14, lines 21 and 26, claim 46, for "screw-threaded" read "screw-thread"; and that the said Letters Patent should be read with these corrections therein that the same may conform to the record of the case in the Patent Office.

Signed and sealed this 16th day of May, A. D. 1933.

M. J. Moore.
Acting Commissioner of Patents.

(Seal)

CERTIFICATE OF CORRECTION

Patent No. 1,900,880.                                        March 7, 1933.

ERIC B. KRAMER.

It is hereby certified that error appears in the printed specification of the above numbered patent requiring correction as follows: Page 5, line 80, strike out "its" second occurrence; page 14, lines 21 and 26, claim 46, for "screw-threaded" read "screw-thread"; and that the said Letters Patent should be read with these corrections therein that the same may conform to the record of the case in the Patent Office.

Signed and sealed this 16th day of May, A. D. 1933.

(Seal)                                                             M. J. Moore.
                                                                    Acting Commissioner of Patents.